United States Patent

[11] 3,617,831

| [72] | Inventor | John F. Moulthrop |
| | | McKean, Pa. |
| [21] | Appl. No. | 16,767 |
| [22] | Filed | Mar. 5, 1970 |
| [45] | Patented | Nov. 2, 1971 |
| [73] | Assignee | Erie Technological Products, Inc. |
| | | Erie, Pa. |

[54] TUBULAR TRIMMER CAPACITOR WITH AN INTERNAL MOVABLE ELECTRODE OF AN AXIALLY WOUND SPIRAL OF MORE THAN ONE TURN OF SPRING METAL
2 Claims, 5 Drawing Figs.

| [52] | U.S. Cl. | 317/249 T, 317/251 |
| [51] | Int. Cl. | H01g 5/01, H01g 5/24 |
| [50] | Field of Search | 317/249 R, 249 T, 251, 252; 336/136; 334/78, 79, 80, 81, 82 |

[56] References Cited
UNITED STATES PATENTS
2,758,268  8/1956  Peyssou .................... 317/249 R FOREIGN PATENTS
600,033  3/1948  Great Britain ............. 317/249 T
920,773  3/1963  Great Britain ............. 317/249 T

*Primary Examiner*—Laramie E. Askin
*Attorney*—Ralph Hammar

ABSTRACT: A capacitor having a tubular dielectric with a stationary external electrode and a tubular internal movable electrode of an axially wound spiral of more than one turn of spring metal having its unstressed outside diameter greater than the inside diameter of the bore of the dielectric.

PATENTED NOV 2 1971 3,617,831
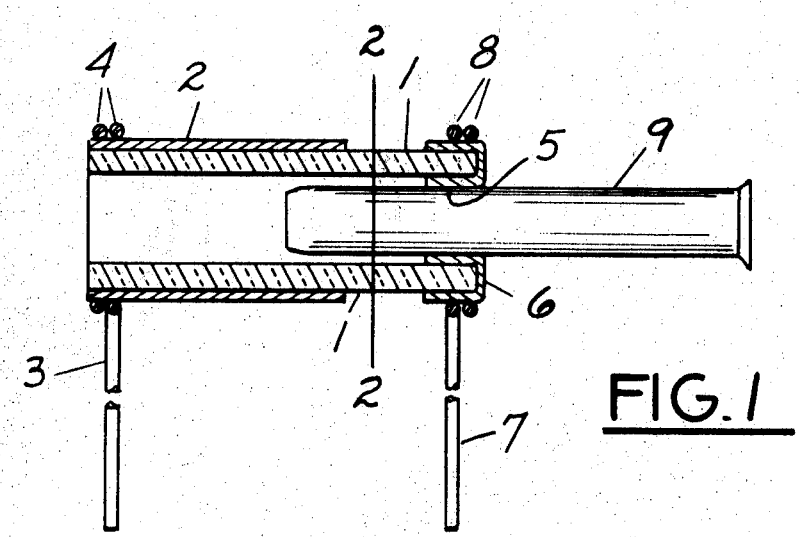
FIG.1
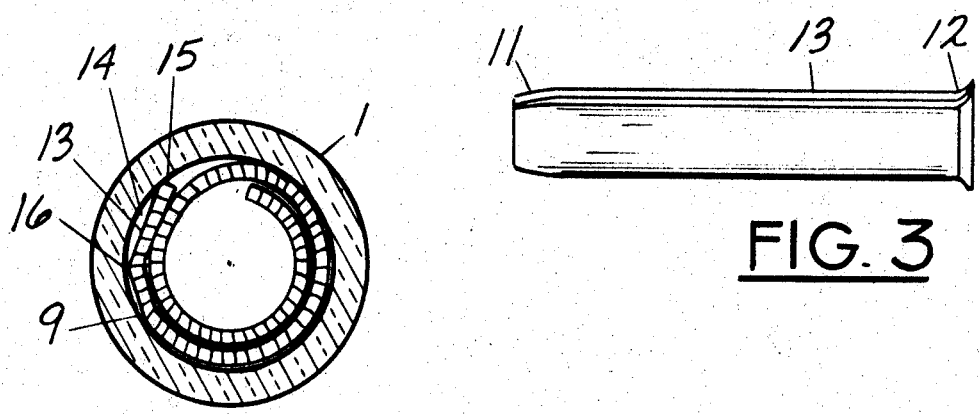
FIG.2
FIG.3
FIG.4
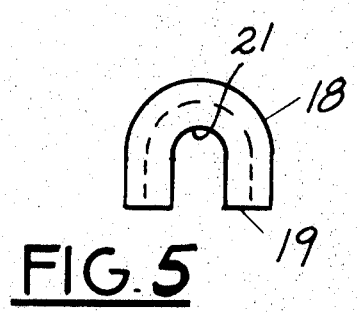
FIG.5
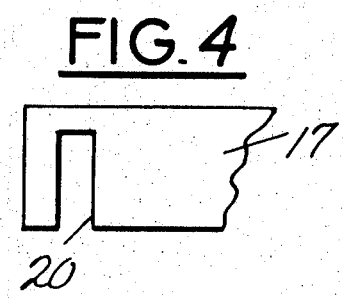
INVENTOR
John F. Moulthrop
BY Ralph Hamma
ATTORNEY

3,617,831

TUBULAR TRIMMER CAPACITOR WITH AN INTERNAL MOVABLE ELECTRODE OF AN AXIALLY WOUND SPIRAL OF MORE THAN ONE TURN OF SPRING METAL

This invention is intended to simplify tubular trimmer capacitors by using a movable electrode in the form of an axially wound spiral of spring metal of more than one turn and with the outside diameter in the unstressed condition greater than the inside diameter of the dielectric.

In the drawing,

FIG. 1 is a longitudinal section through a preferred form a trimmer condenser,

FIG. 2 is a section on line 2—2 of FIG. 1.

FIG. 3 is a side elevation of the movable electrode, and

FIGS. 4 and 5 are side and end views of one form of tool for adjusting the trimmer.

The capacitor has a tubular dielectric 1, preferably of ceramic, having on its outer surface an electrode 2 extending from one end of the dielectric part way toward the other end. The electrode 2 may be applied in the form of a fired-on metallic paint and may have a thickness of 0.0001 inch. A suitable lead 3 is connected to the electrode 2. This lead may take the form of a wire spirally wrapped in a plurality of turns 4 about and soldered to the electrode. An internal terminal electrode 5 at the opposite end of the dielectric 1 has an extension 6 which extends over the end onto the outer surface of the dielectric and is connected to a lead 7 having a plurality of turns 8 wrapped about and soldered to the extension. The electrode 5 and its extension may also consist of one of the fired-on metallic paints and may have a thickness of 0.0001 inch. The thickness of the electrodes 2 and 5 is greatly exaggerated in the drawing.

For the purpose of adjustment of the capacitance appearing between the leads 3 and 7 there is an axially movable electrode 9 in the form of an axially wrapped spiral of sheet metal of more than one turn. A metal such as stainless steel 0.003- to 0.004-inch thick is an example of a suitable metal. The entering end of the tubular electrode 9 is provided with a taper 11 to facilitate insertion into the bore of the dielectric. The opposite end of the electrode 9 is provided with an external flange 12 by which the electrode may be gripped when it is reciprocated. In the unstressed condition, the outside diameter of the electrode 9 is greater than the inside diameter of the bore of the dielectric so that the portion of the electrode 9 within the bore of the dielectric is always under radial compression. This provides electrical contact between the electrode 9 and the internal electrode 5. It also provides for conforming contact between the electrode 9 and the bore of the dielectric which allows the electrode 9 to conform generally with the bore of the dielectric which is normally somewhat out of round or irregular both in radial and axial directions. The inherent resilience of the electrode 9 provides a friction grip on the bore of the dielectric which appears to have little variation with the longitudinal position of the electrode.

The termination of the spiral of the electrode 9 is in the form of an axially extending lip 13 which is arched upward from the balance of the spiral a distance several times the thickness of the metal as shown in Fig. 3. This lip when viewed in cross section is flat as indicated at 14 in Fig. 2. When installed, the longitudinal edges 15, 16 of the termination 13 make contact with the bore of the dielectric 1 as shown in FIG. 2. This urges the pin against the diametrically opposite side of the bore of the dielectric and causes the capacitance between the electrodes 2 and 9 to be a combination of airgap and ceramic dielectrics. The contact between the pin and the bore of the dielectric is maintained as the temperature changes. This combination makes the capacitor less sensitive to changes in dielectric constant of the ceramic and also makes the capacitance less sensitive to expansion and contraction of the dimensions of the ceramic and the electrodes with changes in temperature. By way of example, changing the dielectric from a ceramic having a K of 30 and a temperature coefficient of zero to a ceramic having a K of 85 and a temperature coefficient of −750 parts per million /° C. increased the maximum capacitance from 17.2 pf. to 26 pf. and changed the overall temperature coefficient of the capacitor at maximum capacity from −4.5 parts per million /° C. to +40.4 parts per million /° C.

The capacitor is easily adjusted by a tool which cooperates with the end flange 12 or other termination. One such tool comprises a rod 17 having the external configuration indicated by lines 18, 19 and having a slot 20 for receiving the flange 12 and a bore 21 fitting over the body of the electrode 9.

When installed, the leads 3, 7 which connect the capacitor to the circuit also support the capacitor so no additional mounting is required.

What is claimed is:

1. An adjustable capacitor comprising a tubular dielectric having a stationary external electrode on its outer surface extending from one end part way toward the other end and a stationary internal electrode on its inner surface at the other end axially spaced from the external electrode, a movable electrode having one end entering said other end of the dielectric, the other end of the movable electrode projecting outside said other end of the dielectric, said movable electrode comprising an axially wrapped sheet metal spiral of more than one turn in the unstressed condition, the outside diameter of the movable electrode in the unstressed condition being greater than the inside diameter of the dielectric, the outer termination of the spiral of the movable electrode in the unstressed condition overlapping and being arched upward from the balance of the spiral a distance several times the thickness of the sheet metal, the movable electrode making contact with said internal electrode and extending into adjustable capacity relation with the external electrode, and terminal connections to said external and internal electrodes.

2. The capacitor of claim 1 in which the outer termination of the spiral is a lip which is flat when viewed in cross section in a plane perpendicular to the axis of the movable electrode.

* * * * *